United States Patent
Yoshida et al.

(10) Patent No.: US 10,297,987 B2
(45) Date of Patent: May 21, 2019

(54) GAS INSULATED SWITCHGEAR

(71) Applicant: Mitsubishi Electric Corporation, Chiyoda-ku, Tokyo (JP)

(72) Inventors: Tadahiro Yoshida, Tokyo (JP); Toru Kimura, Tokyo (JP); Koichi Kagawa, Tokyo (JP); Naoki Tanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 20 days.

(21) Appl. No.: 15/542,147

(22) PCT Filed: Apr. 2, 2015

(86) PCT No.: PCT/JP2015/060471
§ 371 (c)(1),
(2) Date: Jul. 7, 2017

(87) PCT Pub. No.: WO2016/157495
PCT Pub. Date: Oct. 6, 2016

(65) Prior Publication Data
US 2018/0269663 A1    Sep. 20, 2018

(51) Int. Cl.
*H02B 13/035* (2006.01)
*H02B 13/045* (2006.01)
(Continued)

(52) U.S. Cl.
CPC ......... *H02B 13/045* (2013.01); *H01H 33/122* (2013.01); *H02B 1/20* (2013.01);
(Continued)

(58) Field of Classification Search
CPC .......... H02B 5/06; H02B 13/035; H02B 1/22; H02B 13/0352; H02B 13/045;
(Continued)

(56) References Cited

U.S. PATENT DOCUMENTS

| 4,445,017 A | 4/1984 | Stewart et al. |
| 5,898,565 A * | 4/1999 | Yamauchi ................ H02B 1/22 337/28 |

(Continued)

FOREIGN PATENT DOCUMENTS

| CN | 101741029 A | 6/2010 |
| CN | 204089010 U | 1/2015 |

(Continued)

OTHER PUBLICATIONS

International Search Report (PCT/ISA/210) dated Jun. 23, 2015, by the Japanese Patent Office as the International Searching Authority for International Application No. PCT/JP2015/060471.

(Continued)

*Primary Examiner* — Adam B Dravininkas
(74) *Attorney, Agent, or Firm* — Buchanan Ingersoll & Rooney PC

(57) ABSTRACT

A basic unit portion configured by a standard unit and a variable unit portion whose shape is configured to be changeable. The basic unit portion includes: a first pressure tank with a first opening portion; a circuit breaker; a first bushing; a first disconnecting switch. The variable unit portion includes: a busbar; a second pressure tank with a second opening portion; a second bushing whose necessary number is disposed in accordance with the number of circuits to be externally connected; and second disconnecting switches which are arranged between the busbar and the second bushing. The first opening portion of the basic unit portion and the second opening portion of the variable unit portion are joined facing each other to form into a constitutional body.

17 Claims, 9 Drawing Sheets

(51) Int. Cl.
*H02B 1/20* (2006.01)
*H01H 33/12* (2006.01)
*H02B 7/06* (2006.01)

(52) U.S. Cl.
CPC ....... *H02B 13/035* (2013.01); *H02B 13/0352* (2013.01); *H02B 13/0354* (2013.01); *H02B 7/06* (2013.01); *H02B 13/0358* (2013.01)

(58) Field of Classification Search
CPC .......... H02B 13/005; H02B 7/01; H02B 1/20; H02B 13/0358
See application file for complete search history.

(56) References Cited

U.S. PATENT DOCUMENTS

| | | | | |
|---|---|---|---|---|
| 6,865,072 | B2* | 3/2005 | Sato | H02B 13/0354 |
| | | | | 218/155 |
| 7,193,172 | B2* | 3/2007 | Rokunohe | H01H 33/22 |
| | | | | 218/43 |
| 7,688,595 | B2* | 3/2010 | Garmong | H05K 9/0001 |
| | | | | 361/752 |
| 8,237,075 | B2* | 8/2012 | Isoya | H01H 33/6661 |
| | | | | 218/118 |
| 9,355,792 | B2* | 5/2016 | Yoshida | H02B 13/0352 |
| 9,825,438 | B2* | 11/2017 | Yoshida | H02B 1/565 |
| 2002/0060204 | A1* | 5/2002 | Tohya | H02B 13/055 |
| | | | | 218/155 |
| 2011/0000886 | A1* | 1/2011 | Isoya | H01H 33/6661 |
| | | | | 218/139 |
| 2011/0299228 | A1* | 12/2011 | Milovac | H02B 11/26 |
| | | | | 361/614 |
| 2012/0113568 | A1* | 5/2012 | Sologuren-Sanchez | |
| | | | | H02B 13/0352 |
| | | | | 361/612 |
| 2015/0340174 | A1* | 11/2015 | Yoshida | H02B 13/0352 |
| | | | | 361/618 |

FOREIGN PATENT DOCUMENTS

| | | |
|---|---|---|
| CN | 105075039 A | 11/2015 |
| DE | 3429711 A1 | 5/1985 |
| JP | 56-145316 U | 11/1981 |
| JP | 2-290111 A | 11/1990 |
| JP | 9-322341 A | 12/1997 |
| JP | 4334852 B2 | 9/2009 |
| WO | 2014/125948 A1 | 8/2014 |

OTHER PUBLICATIONS

Extended European Search Report dated Oct. 9, 2018, issued by the European Patent Office in corresponding European Application No. 15887642.5. (9 pages).

Office Action dated Aug. 2, 2018, by the Chinese Patent Office in corresponding Chinese Patent Application No. 201580078395.X and English translation of the Office Action. (20 pages).

* cited by examiner

GAS INSULATED SWITCHGEAR

TECHNICAL FIELD

The present invention relates to gas insulated switchgears for use in, for example, electric power distribution facilities.

BACKGROUND ART

In conventional gas insulated switchgears, there is a gas insulated switchgear mainly composed of three circuits, which is referred to as a ring main unit for distribution and collection of electrical energy. For example, if the gas insulated switchgear is designed for distribution, each circuit of the three circuits is used for the purpose of drawing-in from the outside, drawing-out to the outside, and electric power supply to distribution destinations.

With the aim of function integration and size reduction of gas insulated switchgear, there is a gas insulated switchgear that integrates switches and connection destinations of three circuits. Furthermore, in order to flexibly cope with apparatuses and the number of circuits which constitute the circuits, there also exist ways in which a gas insulated switchgear is configured in a unit of one board including one circuit or two circuits and these gas insulated switchgears are combined.

PRIOR ART DOCUMENT

Patent Document

Patent Document 1: U.S. Pat. No. 4,445,017
Patent Document 2: Japanese Patent Registration No. 4334852

SUMMARY OF THE INVENTION

Problems to be Solved by the Invention

In the aforementioned conventional gas insulated switchgears, a gas insulated switchgear of Patent Document 1 has a problem in that it is difficult to cope with a change of application circuits, such as an increase or a decrease in the number of circuits and addition of measurement devices. On the other hand, in the case of a gas insulated switchgear of Patent Document 2, although a circuit can be properly configured, an insulation distance against the ground, that is, the insulation distance between a high voltage portion and a ground portion (pressure tank or housing) needs to be secured in each surface; and accordingly, size reduction of the gas insulated switchgear is limited.

The present invention has been made to solve the above described problem, and an object of the present invention is to provide a gas insulated switchgear capable of reducing the outline dimensions of the gas insulated switchgear and obtaining necessary circuit configuration.

Means for Solving the Problem

According to the present invention, there is provided a gas insulated switchgear including: a basic unit portion configured by a standard unit and a variable unit portion whose shape is configured to be changeable. The basic unit portion includes: a first pressure tank in which insulating gas is sealed, and a first opening portion is provided in at least one surface; a circuit breaker which is arranged in the inside of the first pressure tank, and interrupts a large current; a first disconnecting switch which is connected to the circuit breaker, and disconnects a main circuit; and a first bushing that connects the main circuit to an external apparatus. Then, the variable unit portion includes: a busbar which is connected to one side terminal of the circuit breaker, and is extended in one direction; a second pressure tank in which insulating gas is sealed, the busbar is incorporated, a second opening portion facing the first opening portion is provided in at least one surface, and the length thereof is set in the extending direction of the busbar in accordance with the number of circuits to be externally connected; a second bushing whose necessary number is disposed in accordance with the number of circuits to be externally connected, and which passes through a wall of the second pressure tank, and connects an internal main circuit of the second pressure tank to an external apparatus; and one or a plurality of second disconnecting switches which is arranged between the busbar and the second bushing, and disconnects the main circuit. In the gas insulated switchgear, the first opening portion of the basic unit portion and the second opening portion of the variable unit portion are joined facing each other to form into one constitutional body.

Advantageous Effect of the Invention

According to the gas insulated switchgear according to the present invention, since the first opening portion of the basic unit portion and the second opening portion of the variable unit portion are joined facing each other to form into one constitutional body to be configured in one gas compartment, an insulating spacer or the like that partitions between them is not needed: and therefore, there can be obtained a gas insulated switchgear in which an insulation space necessary for the periphery thereof is not needed and outline dimensions can be made smaller as a whole. Furthermore, in the case where a plurality of second disconnecting switches are accommodated in the inside of the second pressure tank, a partition between the disconnecting switches does not exist: and therefore, an insulation space necessary for between the partition and the disconnecting switch is not needed and outline dimensions can be made smaller as a whole.

MODE FOR CARRYING OUT THE INVENTION

Embodiment 1

Figure 1:
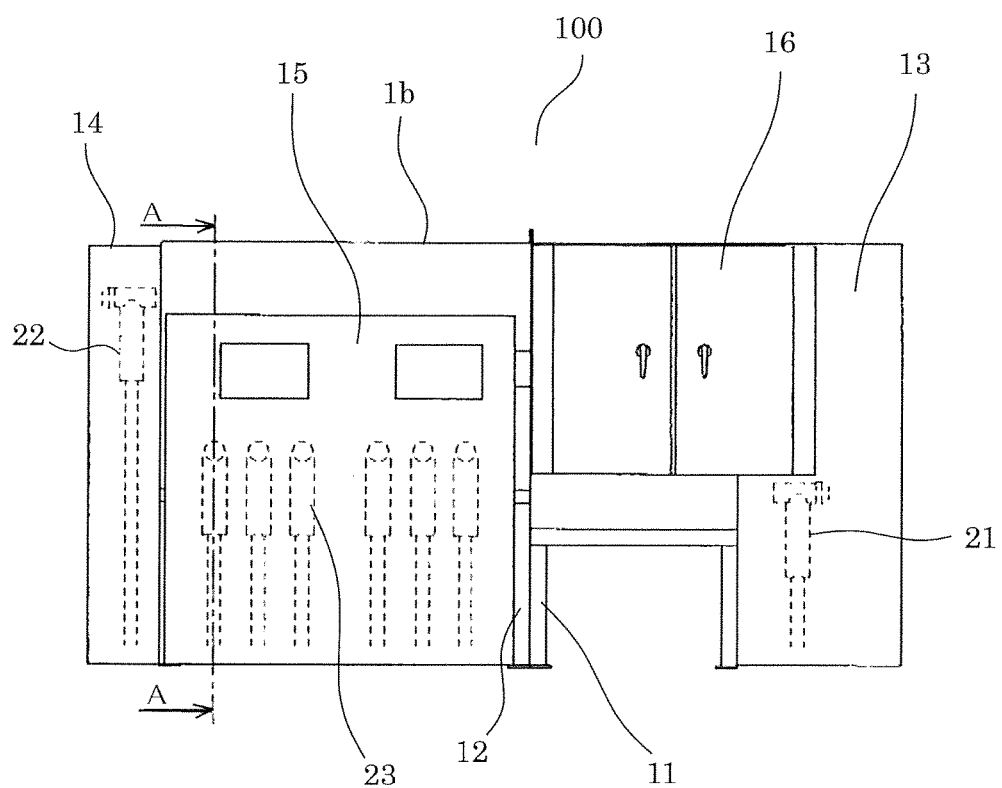
FIG. 1 is a front view showing a gas insulated switchgear according to Embodiment 1 of the present invention.
Figure 2:
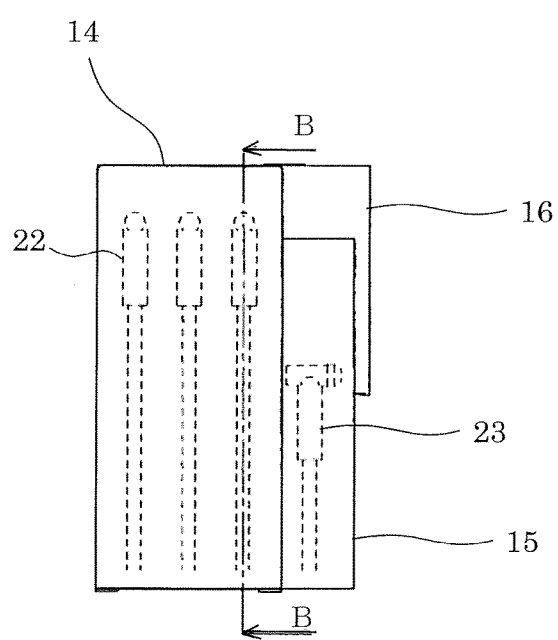
FIG. 2 is a side view showing the gas insulated switchgear according to Embodiment 1 of the present invention.
Figure 3:
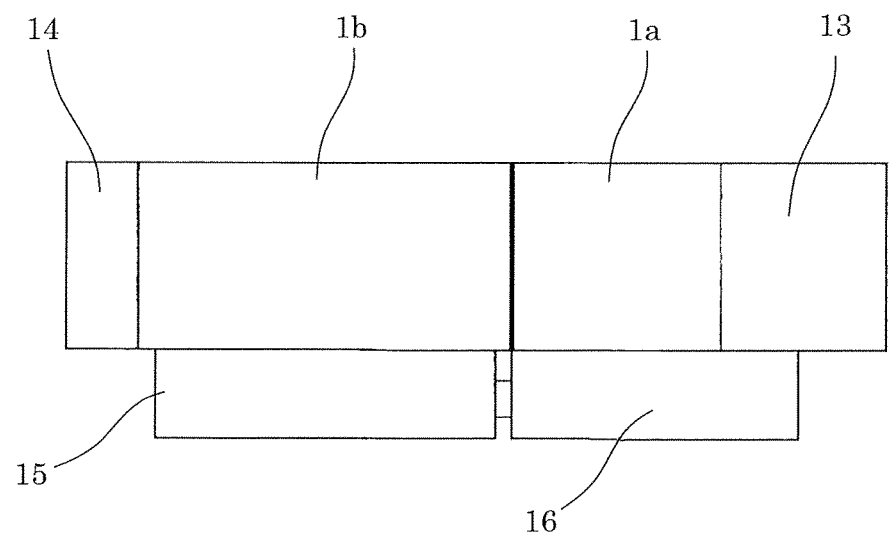
FIG. 3 is a plan view showing the gas insulated switchgear according to Embodiment 1 of the present invention.
Figure 4:
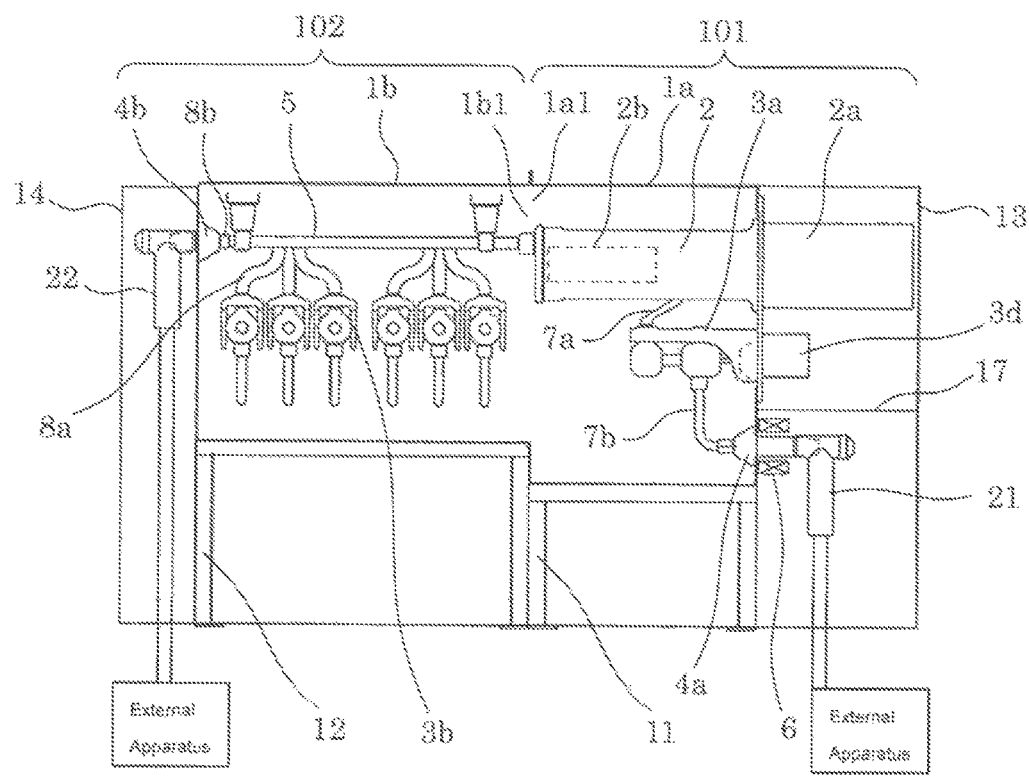
FIG. 4 is a sectional view taken along the line B-B of FIG. 2, which shows the gas insulated switchgear according to Embodiment 1 of the present invention.
Figure 5:
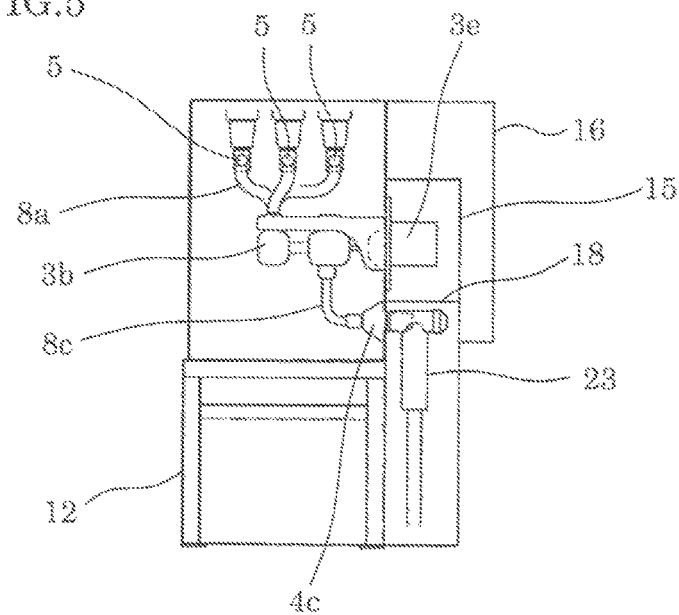
FIG. 5 is a sectional view taken along the line A-A of FIG. 1, which shows the gas insulated switchgear according to Embodiment 1 of the present invention.
Figure 6:
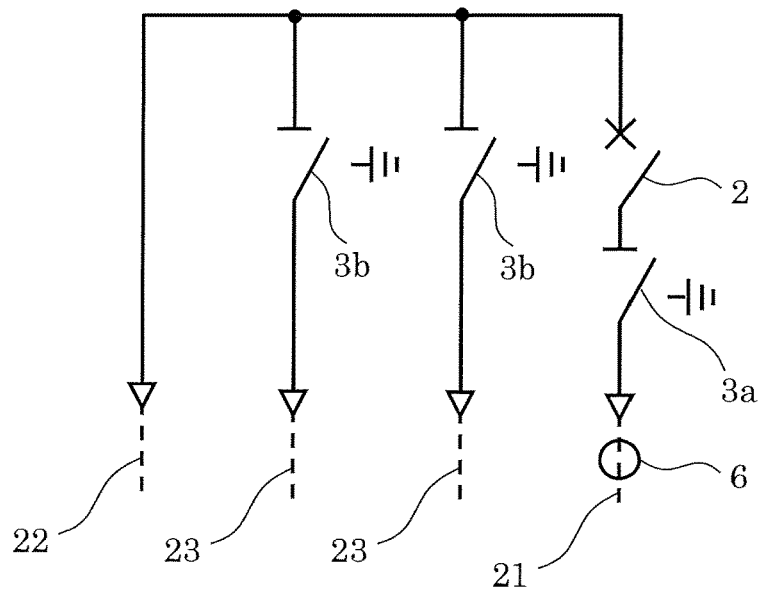
FIG. 6 is a single line connection diagram showing the gas insulated switchgear having the structure of FIG. 1 according to Embodiment 1 of the present invention.
Figure 7:
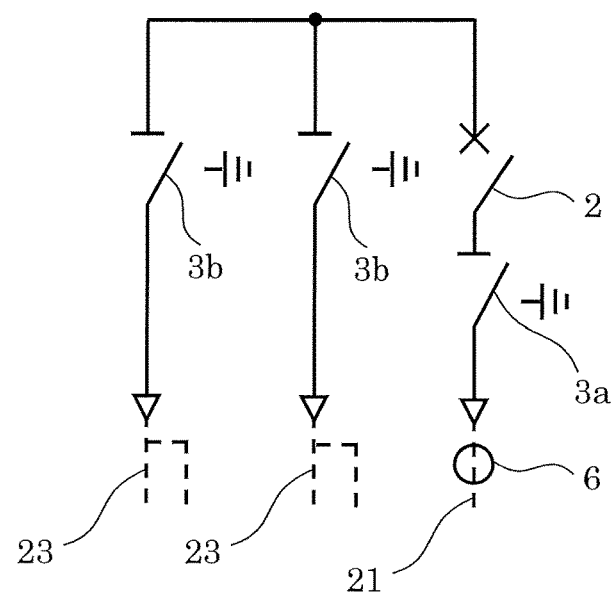
FIG. 7 is a single line connection diagram showing a gas insulated switchgear having the structure of FIG. 8 according to Embodiment 1 of the present invention.
Figure 8:
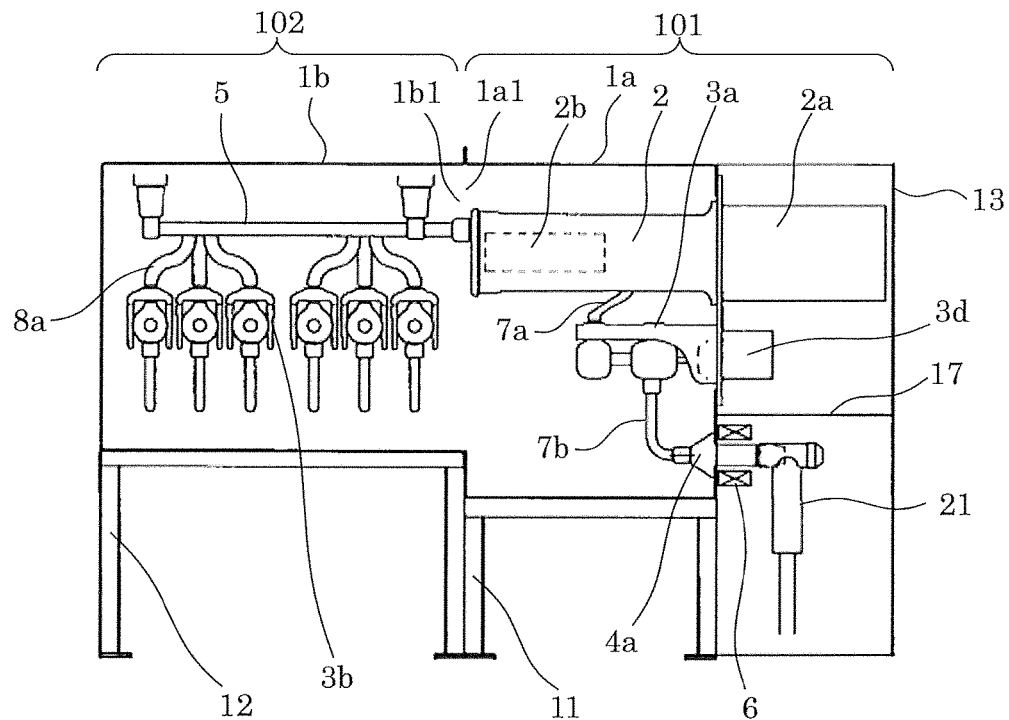
FIG. 8 is a front sectional view showing the gas insulated switchgear according to Embodiment 1 of the present invention.
Figure 9:
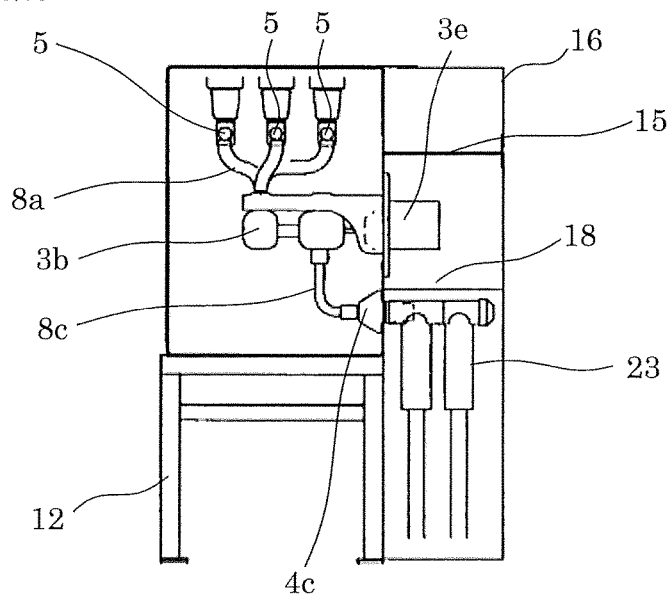
FIG. 9 is a side sectional view showing the gas insulated switchgear according to Embodiment 1 of the present invention.

Hereinafter, Embodiment 1 of the present invention will be described with reference to FIG. 1 to FIG. 9. Then, in each of the drawings, identical or equivalent members and portions will be described with the same reference numerals (and letters) assigned thereto. FIG. 1 is a front view showing a gas insulated switchgear according to Embodiment 1 of the present invention. FIG. 2 is a side view showing the gas insulated switchgear according to Embodiment 1 of the present invention. FIG. 3 is a plan view showing the gas insulated switchgear according to Embodiment 1 of the present invention. FIG. 4 is a sectional view taken along the line B-B of FIG. 2, which shows the gas insulated switchgear according to Embodiment 1 of the present invention. FIG. 5 is a sectional view taken along the line A-A of FIG. 1, which shows the gas insulated switchgear according to Embodiment 1 of the present invention. FIG. 6 is a single line connection diagram showing the gas insulated switchgear having the structure of FIG. 1 according to Embodiment 1 of the present invention. FIG. 7 is a single line connection diagram showing a gas insulated switchgear having the structure of FIG. 8 according to Embodiment 1 of the present invention. FIG. 8 is a front sectional view showing the gas insulated switchgear according to Embodiment 1 of the present invention. FIG. 9 is a side sectional view showing the gas insulated switchgear according to Embodiment 1 of the present invention.

A gas insulated switchgear 100 in this Embodiment 1 includes a basic unit portion 101 including: a first pressure tank 1a in which insulating gas such as hexafluoride (SF6) gas, dry air, and nitrogen is sealed, and is provided with a first opening portion 1a1 at one surface of the first pressure tank 1a; a circuit breaker 2 which is provided with, for example, a vacuum interrupter 2b in the inside, and interrupts a large current; a first disconnecting switch 3a that connects and disconnects a main circuit; a first bushing 4a that connects the main circuit to an external apparatus; a connection conductor 7a that connects the circuit breaker 2 to the first disconnecting switch 3a; and a connection conductor 7b that connects the first disconnecting switch 3a to the first bushing 4a.

Then, the gas insulated switchgear 100 includes a variable unit portion 102 including: a second pressure tank 1b in which insulating gas such as SF6 gas, dry air, and nitrogen is sealed, and is provided with a second opening portion 1b1 facing the first opening portion 1a1 at one surface of the second pressure tank 1b; three busbars 5 for three phases which are each connected to the circuit breaker 2, and are each horizontally disposed with respect to the front of the gas insulated switchgear 100 and the ground; a second disconnecting switch 3b which is connected to the busbar 5 at one end, and connects and disconnects a main circuit; a second bushing 4b which is connected to the busbar 5 at one end, and is connected to an external apparatus; a third bushing 4c which is connected to the other end portion of the second disconnecting switch 3b, and is connected to an external apparatus; a connection conductor 8a which connects the busbar 5 to the second disconnecting switch 3b; a connection conductor 8b which connects the busbar 5 to the second bushing 4b; and a connection conductor 8c which connects the second disconnecting switch 3b to the third bushing 4c.

Then, the first opening portion 1a1 of the first pressure tank 1a and the second opening portion 1b1 of the second pressure tank 1b are butted and joined facing each other to form into one constitutional body. The first pressure tank 1a and the second pressure tank 1b are formed into one constitutional body and the inside thereof can be configured as one gas compartment. Thus, an insulating spacer or the like that partitions between them does not need to be provided; and therefore, there can be obtained a gas insulated switchgear in which an insulation space necessary for the periphery thereof is not needed, and outline dimensions can be made smaller as a whole. Furthermore, in the case where a plurality of the second disconnecting switches are accommodated in the inside of the second pressure tank, the partition between the disconnecting switches does not exist; and therefore, an insulation space necessary for between the partition and the disconnecting switch is not needed and outline dimensions can be made smaller as a whole.

Incidentally, in the standard gas insulated switchgear 100, the first disconnecting switches 3a constitute a three position switch and the second disconnecting switches 3b constitute a three position switch, each three position switch performing three operations of connecting, disconnecting, and grounding.

The first pressure tank 1a of the basic unit portion 101 is supported by a base frame 11. Furthermore, a circuit breaker operating mechanism 2a of the circuit breaker 2, a first disconnecting switch operating mechanism 3d of the first disconnecting switch 3a, and control components are placed on the outside of the first pressure tank 1a and are accommodated in an compartment 13 for protection. The compartment 13 is also supported by a base frame 11. The compartment 13 protects by covering an exposed portion of the first bushing 4a on the outside of the tank and the outer periphery of the cable terminal 21 to be connected to the exposed portion. Then, in order to avoid spreading the influence of an unexpected fault, a partition 17 is disposed between a cable installed place and an installed place of the circuit breaker operating mechanism 2a of the circuit breaker 2, the first disconnecting switch operating mechanism 3d, or the like to partition so as to separate both spaces.

Furthermore, an annular current transformer 6 for main circuit current measurement is attached on the outer periphery of the first bushing 4a protruded to the outside of the first pressure tank 1a.

The second pressure tank 1b of the variable unit portion 102 is supported by a base frame 12. Furthermore, a second disconnecting switch operating mechanism 3e of the second disconnecting switch 3b and control components are placed on the outside of the tank and are accommodated in an compartment 15 in order to protect an internal structure by separating from external environment of the gas insulated switchgear 100. The compartment 15 is also supported by the base frame 12. The compartment 15 also protects an exposed portion of the third bushing 4c on the outside of the second pressure tank 1b and a cable terminal 23 to be connected to the exposed portion. Then, in order to avoid spreading the influence of an unexpected fault, a partition 18 is disposed between a cable installed place and an installed place of the second disconnecting switch operating mechanism 3e and the like to separate spaces of the second disconnecting switch operating mechanism 3e portion and the cable connection portion. Further, in order to protect an exposed portion of the bushing 4b on the outside of the second pressure tank 1b and the cable terminal 22 to be connected to the exposed portion are accommodated in an compartment 14; and the compartment 14 is supported by the second pressure tank 1b and the base frame 12.

The compartment 13 and the compartment 15 are connected to a control box 16 to be a structure that can dispose necessary control circuits. The control box 16 is supported by the base frame 11.

FIG. 6 is a single line connection diagram and the most right side circuit of FIG. 6 shows a circuit of the basic unit portion 101. Circuits other than that and a busbar that commonly connects those circuits show a circuit of the variable unit portion 102. The circuit of the basic unit portion 101 is a generally this circuit and fulfills a function as a circuit to be connected to a drawing-in portion. On the other hand, it is assumed that the circuit of the variable unit portion 102 is fluctuated by: the number of circuits in which the gas insulated switchgear 100 is externally connected, that is, by the sum of one drawing-in circuit and the number of drawing-out circuits; and switching apparatuses, measurement devices, and the number of connection cables which are to be accommodated. The shapes of the installed apparatus of the variable unit portion 102 and the second pressure tank 1b are changed in accordance with fluctuating elements.

As an example, there is shown a case example where the number of circuits and the number of connection cables are changed. FIG. 7, FIG. 8, and FIG. 9 show a single line diagram, a front sectional view, and a side sectional view, respectively. FIG. 7 shows a circuit in which one of the number of circuits is reduced from FIG. 6 and the number of connection cables is changed from one to two. The structure of the gas insulated switchgear 100 in this case becomes as shown in FIG. 8 and FIG. 9. In the front sectional view of FIG. 8, the cable terminal 23 is increased to two branches; and in the side sectional view of FIG. 9, it becomes a structure in which the second bushing 4b and the cable terminal 22 are deleted.

The insulation distance between the respective circuits, especially, between the circuits in the variable unit portion 102 can be reduced by enclosing a plurality of circuits in one gas compartment. In FIG. 4, there exists only an insulation space between each other's apparatuses in between two second disconnecting switches 3b. If, in the case of the gas insulated switchgear in which the respective circuits are individually configured as disclosed in Patent Document 2, there exists a grounded partition (pressure tank wall) between the apparatuses; and an insulating space needs to be provided between each apparatus and the partition. These partitions are deleted in Embodiment 1 of the present invention and a plurality of circuits is accommodated in one gas compartment, whereby reduction in outline dimensions of the gas insulated switchgear 100, especially, width dimension can be achieved.

The gas insulated switchgear 100 is divided into two portions of the basic unit portion 101 and the variable unit portion 102, whereby the basic unit portion 101 can be manufactured as a standard unit in any application circuit. Therefore, planned production such as stocking of members can be made and cost reduction can be achieved.

Furthermore, as shown in FIG. 4, it is structured such that the connection circuit excluding the second disconnecting switches 3b of the variable unit portion 102 is directly connected to the busbar 5, and the dimensions and structure of the second pressure tank 1b are made common to the case where the circuit excluding the second disconnecting switches 3b does not exist (FIG. 8), whereby types of the pressure tanks are reduced and planned production and cost reduction can be achieved.

The control box 16 is formed into a structure capable of accommodating control devices necessary for the maximum condition of an application circuit of the gas insulated switchgear 100, and it is structured such that the control box 16 is supported by only the base frame 11, whereby the control box 16 can be made common even when the circuit condition is changed and planned production and cost reduction of the control box 16 can be achieved.

As described above, the gas insulated switchgear 100 is divided into two portions of the basic unit portion 101 and the variable unit portion 102, whereby the basic unit portion 101 can be manufactured as a standard unit in any application circuit. Therefore, planned production such as stocking of members can be made and cost reduction can be achieved.

Embodiment 2

Figure 10:
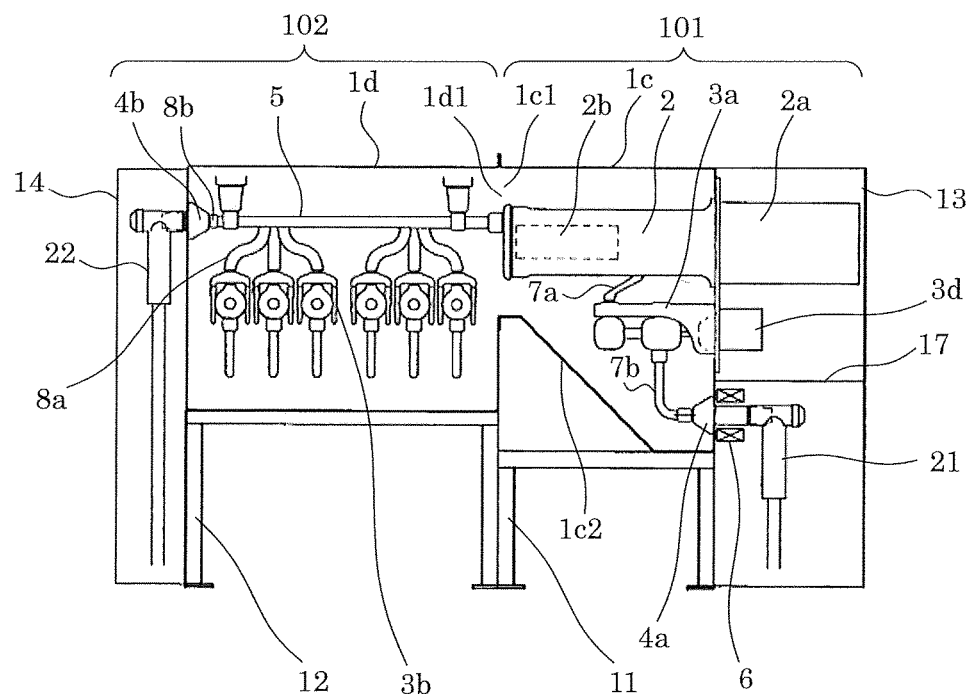
FIG. 10 is a front sectional view showing a gas insulated switchgear according to Embodiment 2 of the present invention.

Embodiment 2 of the present invention will be described with reference to FIG. 10. Then, in the drawing, identical or equivalent members and portions will be described with the same reference numerals (and letters) assigned thereto. FIG. 10 is a front sectional view showing a gas insulated switchgear according to Embodiment 2 of the present invention.

In FIG. 10, description of portions similar to the aforementioned Embodiment 1 will be omitted. In FIG. 10, a first opening portion 1c1 is made small by providing an inclined portion 1c2 in which a part of the bottom surface of a first pressure tank 1c of a basic unit portion 101 is made incline; a second opening portion 1d1 of a second pressure tank 1d of a variable unit portion 102 is made small by adjusting to the first opening portion 1c1; and the first opening portion 1c1 of the first pressure tank 1c of the basic unit portion 101 and the second opening portion 1d1 of the second pressure tank 1d of the variable unit portion 102 are butted and joined. As described above, the shape of the first pressure tank 1c is changed so that a space where there exists no installed apparatus is reduced, whereby a gas compartment space can be reduced and therefore the amount of usage of insulating gas can be reduced. Furthermore, the first opening portion 1c1 and the second opening portion 1d1 are made small, whereby reliability of an airtight sealing portion is improved and fastening work in joining the unit portions can be reduced.

Embodiment 3

Figure 11:
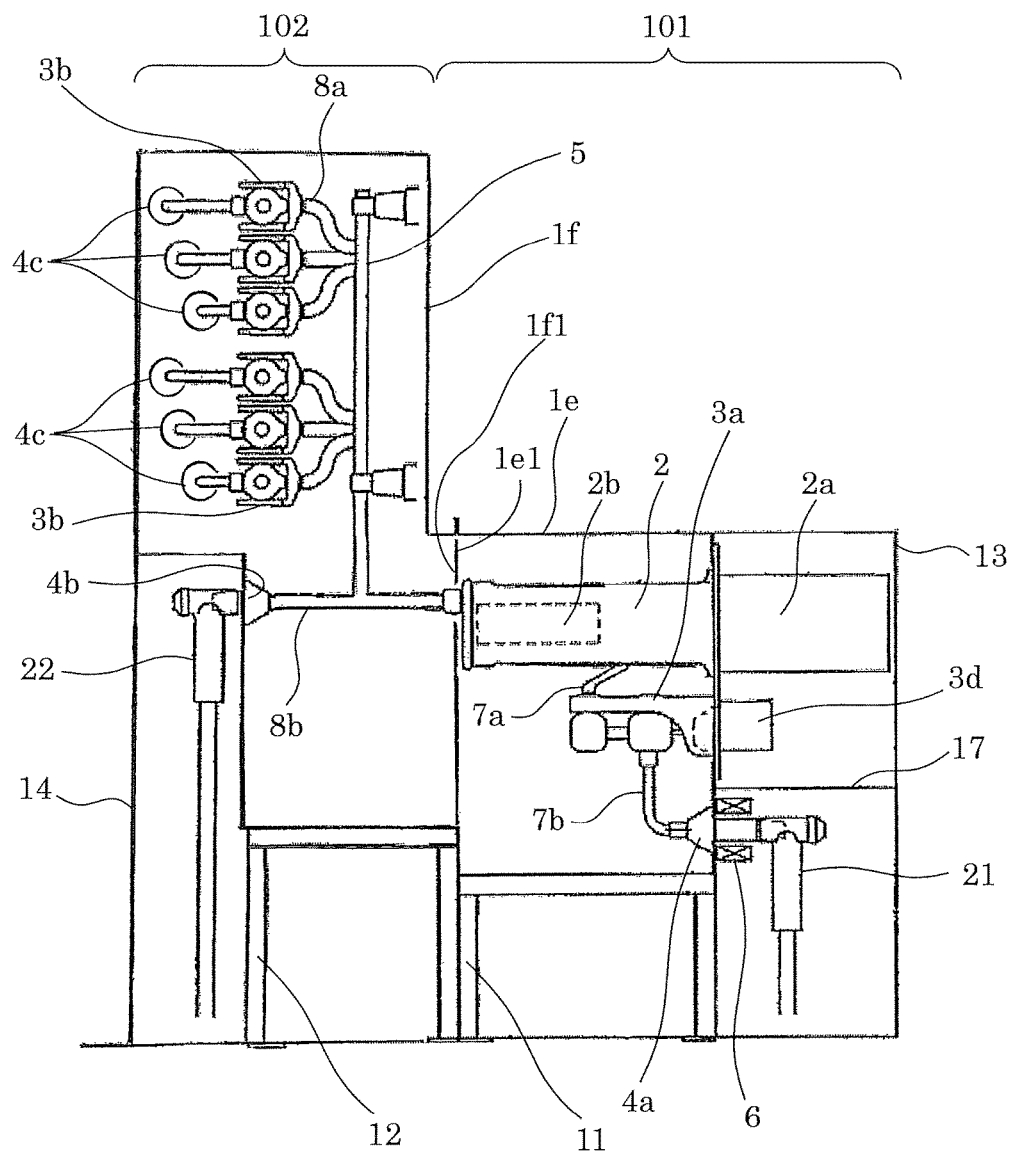
FIG. 11 is a side sectional view showing a gas insulated switchgear according to Embodiment 3 of the present invention.
Figure 12:
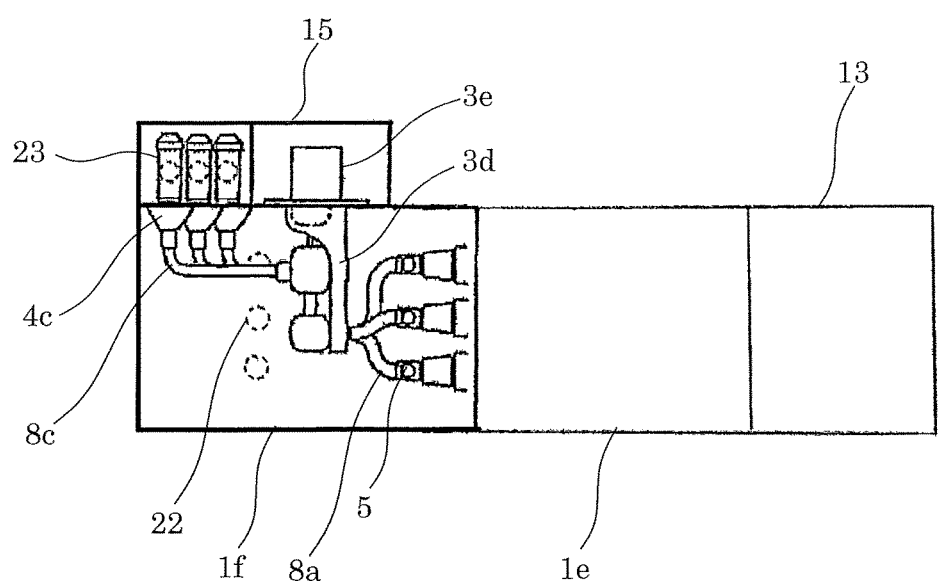
FIG. 12 is a plan sectional view showing the gas insulated switchgear according to Embodiment 3 of the present invention.

Embodiment 3 of the present invention will be described with reference to FIG. 11 and FIG. 12. Then, in each of the drawings, identical or equivalent members and portions will be described with the same reference numerals (and letters) assigned thereto. FIG. 11 is a side sectional view showing a gas insulated switchgear according to Embodiment 3 of the present invention. FIG. 12 is a plan sectional view showing a gas insulated switchgear according to Embodiment 3 of the present invention.

In this Embodiment 3, a second opening portion 1f1 of a variable unit portion 102 having a second pressure tank 1f is butted and joined to a first opening portion 1e1 on a rear portion of a basic unit portion 101 having a first pressure tank 1e to form into one constitutional body. Then, a second disconnecting switch 3b whose one end is connected to one end portion of a circuit breaker 2 and is branched and connected for each circuit from each of vertically extended three busbars for three phases 5, and a third bushing 4c and a cable terminal 23 which are connected to the end of the second disconnecting switch 3b are arranged upward in a pile-up direction for each circuit. Furthermore, in FIG. 11, a cable terminal 22 is connected at an end portion of a connection conductor led out to the left direction from one end of the circuit breaker 2 via a second bushing 4b which passes through and is attached to a wall portion of the second pressure tank 1f.

Furthermore, in FIG. 12, a main circuit branched from the second disconnecting switch 3b passes through a wall of the second pressure tank 1f by the third bushing 4c and one end portion thereof is connected to the cable terminal 23. In FIG. 12, one shown by a circular dashed line at the midpoint of the cable terminal 23 shows a cable that is extended downward. As shown in FIG. 11, vertically extended cables for three phases do not interfere with each other by shifting the third bushings 4c for three phases from side to side and therefore it becomes easy to connect the cable terminal 23 to the third bushing 4c.

As described above, the busbars 5 are vertically extended and branch circuits therefrom are configured so as to vertically pile-up, whereby, for example, like a tower for a wind turbine, such a configuration can easily cope with a case where restriction in a ceiling direction is relatively small although the installation area of the gas insulated switchgear is narrow. In such a case, branch main circuits connected correspondingly to respective circuits are arranged so as to vertically pile-up even when the number of circuits of electric power lines that connect between towers for respective wind turbines is increased, whereby it can easily cope with circuit connection of a plurality of electric power lines even when the installation area is narrow.

Incidentally, in this Embodiment 3, there is shown an example configured such that the busbars 5 are vertically extended and the branch circuits therefrom are vertically piled up; however, the present invention is not limited to this; and even when the busbars 5 are not arranged in a vertical direction, but, for example, are arranged with being inclined vertically (i.e. obliquely), such a configuration can easily cope with connection of a plurality of circuits even when the installation area is narrow although the installation area increases as compared to the above case example.

Incidentally, the present invention can freely combine the respective embodiments and appropriately modify and/or omit the respective embodiments within the scope of the present invention.

INDUSTRIAL APPLICABILITY

The present invention is suitable to achieve the gas insulated switchgear in which the first opening portion of the first pressure tank and the second opening portion of the second pressure tank are butted and joined facing each other to form into one constitutional body and the inside thereof can be configured as one gas compartment.

The invention claimed is:

1. A gas insulated switchgear comprising:
   a basic unit portion configured by a standard unit and a variable unit portion,
   said basic unit portion including:
      a first pressure tank in which insulating gas is sealed, and a first opening portion is provided in at least one surface of the first pressure tank;
      a circuit breaker which is arranged in the inside of said first pressure tank, and configured to interrupt a large current;
      a first disconnecting switch which is connected to said circuit breaker, and configured to disconnect a main circuit; and
      a first bushing that connects said main circuit to an external apparatus, and
   said variable unit portion including:
      a busbar which is connected to one side terminal of said circuit breaker, and is extended in one direction;
      a second pressure tank in which insulating gas is sealed, a second opening portion facing the first opening portion is provided in at least one surface of the second pressure tank, wherein the busbar is provided in the second pressure tank and the length of the second pressure tank is set in the extending direction of said busbar in accordance with the number of circuits to be externally connected;
      at least one second bushing provided in accordance with the number of circuits to be externally connected, each second bushing passing through a wall of said second pressure tank and connecting an internal main circuit of said second pressure tank to an external apparatus; and
      one or a plurality of second disconnecting switches is connected to said busbar, and disconnects said main circuit,
   wherein the first opening portion of said basic unit portion and the second opening portion of said variable unit portion are joined facing each other to form into a single body.

2. The gas insulated switchgear according to claim 1, wherein said busbar is horizontally disposed with respect to the ground.

3. The gas insulated switchgear according to claim 2, wherein the variable unit portion is configured so that whether said busbar is connected to said second bushing directly or via said second disconnecting switch is selectable.

4. The gas insulated switchgear according to claim 2, wherein said second bushing to be connected to said busbar is disposed on a wall of said second pressure tank.

5. The gas insulated switchgear according to claim 2, wherein a shape of said first pressure tank is made common irrespective of the presence or absence of said second bushing to be connected to said busbar.

6. The gas insulated switchgear according to claim 2, wherein a bottom surface of said first pressure tank of said basic unit portion is inclined to limit a size of the first opening portion and the second opening portion of said second pressure tank of said variable unit portion is sized according to the first opening portion.

7. The gas insulated switchgear according to claim 1, wherein said busbar is vertically disposed with respect to the ground.

8. The gas insulated switchgear according to claim 7,
wherein the variable unit portion is configured so that whether said busbar is connected to said second bushing directly or via said second disconnecting switch is selectable.

9. The gas insulated switchgear according to claim 7,
wherein said second bushing to be connected to said busbar is disposed on a wall of said second pressure tank.

10. The gas insulated switchgear according to claim 7,
wherein a shape of said first pressure tank is made common irrespective of the presence or absence of said second bushing to be connected to said busbar.

11. The gas insulated switchgear according to claim 7,
wherein a bottom surface of said first pressure tank of said basic unit portion is inclined to limit a size of the first opening portion and the second opening portion of said second pressure tank of said variable unit portion is sized according to the first opening portion.

12. The gas insulated switchgear according to claim 1,
wherein the variable unit portion is configured so that whether said busbar is connected to said second bushing directly or via said second disconnecting switch is selectable.

13. The gas insulated switchgear according to claim 1,
wherein said second bushing to be connected to said busbar is disposed on a wall of said second pressure tank.

14. The gas insulated switchgear according to claim 1,
wherein a shape of said first pressure tank is made common irrespective of the presence or absence of said second bushing to be connected to said busbar.

15. The gas insulated switchgear according to claim 1,
wherein said first disconnecting switches constitute a three position switch which performs three operations of connecting, disconnecting, and grounding.

16. The gas insulated switchgear according to claim 1,
wherein said second disconnecting switches constitute a three position switch which performs three operations of connecting, disconnecting, and grounding.

17. The gas insulated switchgear according to claim 1,
wherein a bottom surface of said first pressure tank of said basic unit portion is inclined to limit a size of the first opening portion and the second opening portion of said second pressure tank of said variable unit portion is sized according to the first opening portion.

* * * * *